United States Patent [19]

Yamaguchi et al.

[11] Patent Number: 4,633,931
[45] Date of Patent: Jan. 6, 1987

[54] METHOD OF PRODUCING FIBER-REINFORCED COMPOSITE BODY

[75] Inventors: Fumio Yamaguchi, Sakado; Yoshiaki Nakaniwa, Sayama; Yoshiaki Masuda, Kawagoe; Hisayuki Sakurai, Kasukabe; Waichiro Nakashima, Kawagoe, all of Japan

[73] Assignee: Honda Giken Kogyo Kabushiki Kaisha, Tokyo, Japan

[21] Appl. No.: 589,515

[22] Filed: Mar. 14, 1984

[30] Foreign Application Priority Data

Nov. 1, 1983 [JP] Japan ................................ 58-205559

[51] Int. Cl.$^4$ ............................................. B22D 19/14
[52] U.S. Cl. .................................... 164/110; 164/120; 164/97
[58] Field of Search .................... 164/97, 120, 108-110

[56] References Cited

U.S. PATENT DOCUMENTS 3,270,383 9/1966 Hall et al. ........................... 164/120
4,318,438 3/1982 Ban et al. ........................... 164/97

FOREIGN PATENT DOCUMENTS 57-97861 6/1982 Japan ................................... 164/120
57-171559 10/1982 Japan ................................... 164/120

Primary Examiner—Kuang Y. Lin
Attorney, Agent, or Firm—Roberts, Spiecens & Cohen

[57] ABSTRACT

A method of producing a fiber-reinforced composite material comprising the steps of arranging a fiber shaped article in a cavity of a casting mold; pouring a molten metal acting as a matrix into the cavity and subjecting the molten metal to primary pressure; holding the molten metal under pressure for a predetermined period of time; and subjecting the molten metal, at least in proximity of one end of the fiber shaped article, to secondary pressure with a high hydrostatic pressure after the predetermined period of time has passed, to fill the molted metal into the fiber shaped article and integrate them.

19 Claims, 6 Drawing Figures

METHOD OF PRODUCING FIBER-REINFORCED COMPOSITE BODY

BACKGROUND OF THE INVENTION

1. Field of the Invention

This invention relates generally to a method of producing a fiber-reinforced composite body, and more particularly to a method of producing a fiber-reinforced composite body which uses a metal as a matrix.

2. Description of the Prior Art

A conventional method of producing a fiber-reinforced composite material of this kind comprises filling a molten metal acting as a matrix into a fiber shaped article placed in a cavity of a casting mold to unite them into a composite body, by high-pressure solidification casting. The casting operation serves to form the composite body in which a predetermined portion is reinforced by the fibers.

However, it is not always possible to reliably fill the molten metal into the fiber shaped article simply by applying a high hydrostatic pressure to the molten metal when it is poured into the cavity, and internal defects are likely to occur. Thus, a high-quality composite body can not be reliably obtained.

SUMMARY OF THE INVENTION

An object of the present invention is to provide a method of reliably producing a fiber-reinforced composite body of high quality which is devoid of any internal defects, by filling a molten metal into a fiber shaped article.

To accomplish the object described above, the present invention provides a method of producing a fiber-reinforced composite body, comprising the steps of arranging a fiber shaped article in a cavity of a casting mold; pouring molten metal acting as a matrix into the cavity and subjecting the molten metal to a primary pressure; maintaining the molten metal under the primary pressure for a predetermined period of time; and subjecting the molten metal to a secondary pressure of a higher hydrostatic magnitude than the primary pressure, at least in a region proximate one end of the fiber shaped article, after said predetermined period has elapsed, to integrate the molten metal with the fiber shaped article.

There is further contemplated a method of producing a fiber-reinforced composite body, comprising the steps of arranging a fiber shaped article in a cavity of a casting mold, and pouring molten metal, acting as a matrix, into the cavity, and filling the molten metal into the fiber shaped article to unite them as a composite, by high-pressure solidification casting, wherein when the molten metal is subjected to high-pressure solidification, the molten metal in proximity of both ends of the fiber shaped article is pressurized.

If the molten metal poured into the cavity is held at the primary pressure to bring it into a semi-solidified state, and the semi-solidified molten metal is then filled reliably into the fiber shaped article to integrate them composite, by secondary pressure in the manner described above, a fiber-reinforced composite material of high quality and devoid of internal defects can be obtained.

If molten metal in the proximity both ends of the fiber shaped article is compressed while being subjected to high-pressure solidification, the molten metal can be efficiently filled into the fiber shaped article and be united therewith.

The above and other objects and features of the present invention will become apparent from the following description of the invention to be taken in conjunction with the accompanying drawings.

DESCRIPTION OF THE PREFERRED EMBODIMENT

Hereinafter, one embodiment of the present invention will be described with reference to the drawings, this embodiment being suitable for the production of a connecting rod of an internal-combustion engine, whose rod portion is reinforced by fibers.

Figure 1:
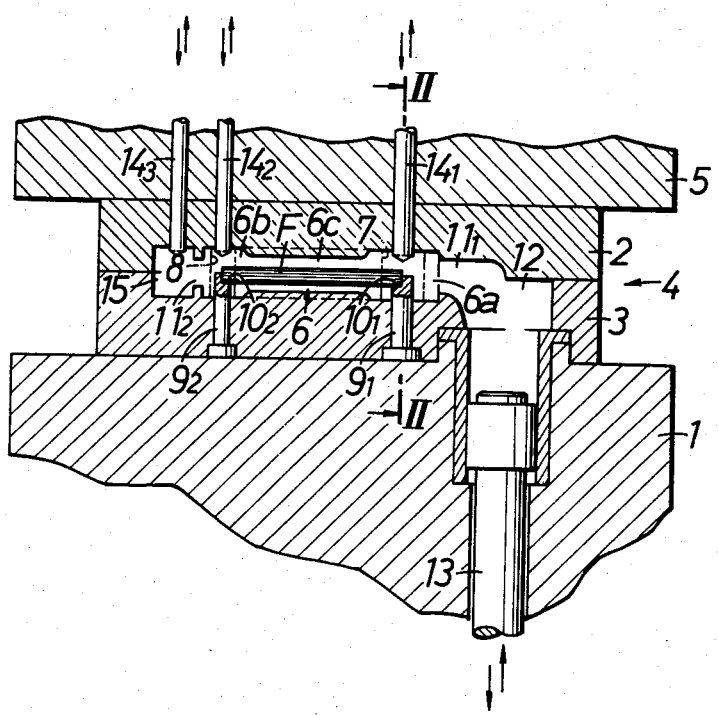
FIG. 1 is a longitudinal sectional view of apparatus according to the invention for casting a connecting rod.
Figure 2:
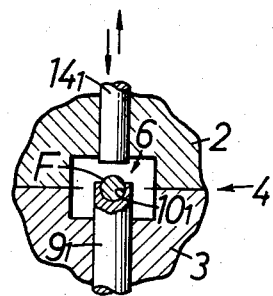
FIG. 2 is a sectional view taken on the line II—II in FIG. 1.

FIGS. 1 and 2 illustrate an apparatus for casting a connecting rod. Therein is seen a mold 4 consisting of an upper mold part 2 and a lower mold part 3 placed on a bed 1 in such a fashion that the lower mold part 3 is attached to the bed 1, while the upper mold part 2 is attached to a holder 5 which is moved up and down by a hydraulic mechanism (not shown) or the like. A cavity 6 is defined by the upper mold part 2 in cooperation with the lower mold part 3. First and second set pins $9_1$ and $9_2$, whose diameters are somewhat smaller than those of big-end and small-end holes 7 and 8, respectively, project from the lower mold part 3 at a big-end forming portion 6a and a small end forming portion 6b, respectively. Notched grooves $10_1$ and $10_2$, each having a U-shape in plan view, are formed at the ends of the set pins $9_1$ and $9_2$ so as to face each other and hold a fiber shaped article F.

The big-end forming portion 6a communicates with a pouring gate 12 through a gate $11_1$, and the end of a plunger 13 for filling in molten metal protrudes into the pouring gate 12. The plunger 13 is slidably fitted into the base 1. The molten metal is supplied to the pouring gate 12 from a molten metal feed mechanism, not shown.

Three press punches $14_1$–$14_3$ fit into the holder 5 and the upper mold part 2 so that they can slide up and down. The ends of the press punches $14_1$–$14_3$ fit into the big-end and small-end forming portions 6a, 6b and into a runner box 15 which communicates with the small-end forming portion 6b through a gate $11_2$. The diameters of the first and second press punches $14_1$, $14_2$ are slightly smaller than the diameters of the big-end and small-end holes 7 and 8, and their axes are aligned with the axes of the first and second set pins $9_1$ and $9_2$.

Using long fibers, such as metal fibers, for example, stainless steel fibers, the fiber shaped article F is shaped into a rod-like form with an appropriate bulk density. After the upper mold part 2 is raised, the two ends of the fiber shaped article F are forced into the notched grooves $10_1$, $10_2$ of the set pins $9_1$, $9_2$, and the fiber shaped article F is thus held in place between the two set pins $9_1$ and $9_2$. In this case, the fiber shaped article F is positioned at the center of the rod-forming portion $6c$ of the cavity 6 in accordance with the distance by which the set pins $9_1$, $9_2$ project from the lower mold part 3, and the height of the notched grooves $10_1$, $10_2$. The diameter of the fiber shaped article F is slightly greater than the width of each notched groove $10_1$, $10_2$, while its length is slightly shorter than the distance between the notched grooves $10_1$, $10_2$, so that the fiber shaped article F is held firmly between the two set pins $9_1$ and $9_2$.

The capacity of the runner box 15 is two or three times the volume around the fiber shaped article F. The molten metal remaining in this runner box 15 keeps the fiber shaped article F and the small-end forming portion $6b$ hot.

When casting a connecting rod, the casting mold 4 is heated to a temperature between 250° to 350° C., and the fiber shaped article F to between 460° to 700° C. Molten metal consisting of an aluminum alloy and having a temperature of between 700° and 800° C. is supplied from a molten metal feed mechanism, not shown, to the pouring gate 12. Next, the plunger 13 for filling in the molten metal is moved up, and the molten metal is then urged into the cavity 6 and the runner box 15 so that the molten metal flows through the gate $11_1$ at a relatively slow speed of from 0.09 to 0.17 m/sec. Thereafter, the molten metal is subjected to primary pressure by the plunger 13 to 360 to 600 kg/cm$^2$ (FIG. 3, line a).

Figure 3:
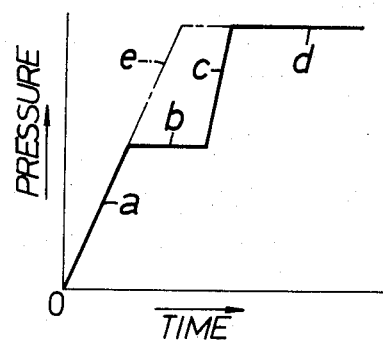
FIG. 3 is a graph of the change of pressure with respect to time.

The molten metal is held under this pressure for between 1 to 10 seconds until it is semi-solidified (FIG. 3, line b). Then each press punch $14_1$–$14_3$ locally pressurizes the now semi-solidified molten metal at the big-end and small-end portions $6a$, $6b$, and thus the semi-solidified molten metal in the proximity of the two ends of the fiber shaped article F and of the runner box 15, at a pressure of between 1,000 to 2,500 kg/cm$^2$ and, at the same time, the plunger 13 compresses the metal in the pouring gate 12 to a pressure of between 1,000 to 1,200 kg/cm$^2$ so that a secondary pressure application is effected at a high hydrostatic pressure (FIG. 3, line c), and the semi-solidified molten metal is filled into and united with the fiber shaped article. Under this pressure, the molten metal is completely solidified (FIG. 3, line d). Since the molten metal in the runner box 15 is pressurized at two positions, the molten metal is urged towards the cavity 6, and the efficiency with which the molten metal is filled into the fiber shaped article F is improved.

A connecting rod blank can be cast in the manner described above. In this casting process, the fiber shaped article F is held by the two set pins $9_1$, $9_2$, so that no deviation of position occurs.

Figure 4:
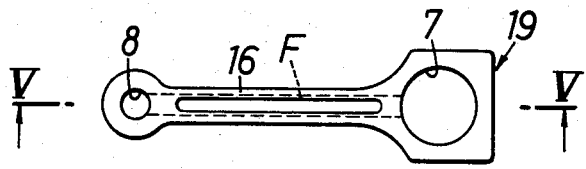
FIG. 4 is a plan view of a connecting rod.
Figure 5:
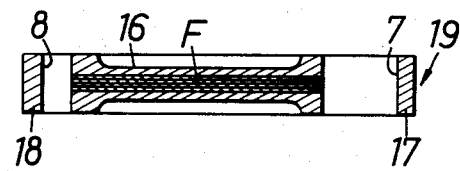
FIG. 5 is a sectional view taken on line V—V in FIG. 4.

Then the connecting rod blank is released from the mold, and is subjected to machining to finish the big-end and small-end holes 7, 8 to predetermined dimensions. Thus a connecting rod 19 whose rod portion 16 is fiber-reinforced in the axial direction, as shown in FIGS. 4 and 5, and which is equipped with the big-end and small-end portions 17, 18 and with the rod portion 16 can be obtained.

Figure 6:
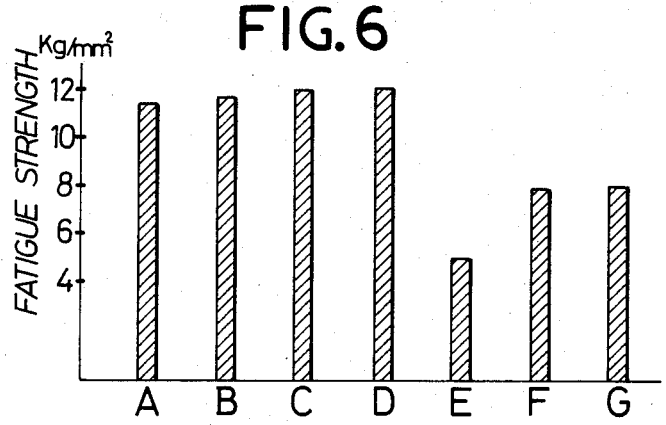
FIG. 6 is a bar graph of experimental results of fatigue strength tests on connecting rods.

FIG. 6 illustrates experimental results of fatigue strength tests conducted on connecting rods A–D obtained by the method of the present invention, that is, by the two-stage application of pressure, and connecting rods E–G obtained by a single-stage application of pressure, represented by line e in FIG. 3. The number of times stress was repeated was 1,000,000 for connecting rods A through G.

The pressure conditions for connecting rods A through D obtained by the method of the present invention were as follows.

| Connecting rod | A | B | C | D |
|---|---|---|---|---|
| Primary pressure (kg/cm$^2$) | 400 | 500 | 600 | 600 |
| Secondary pressure (kg/cm$^2$) | 1,000 | 1,100 | 1,200 | 2,500 |

The pressure conditions for connecting rods E through G obtained by the single-stage application of pressure were as follows.

| Connecting rod | E | F | G |
|---|---|---|---|
| Pressure (kg/cm$^2$) | 600 | 1,000 | 1,200 |

As can be seen clearly from FIG. 6, connecting rods A–D obtained by the method of the present invention had fatigue strengths which were much higher than those of connecting rods E–G obtained by the single-stage application of pressure. This results from the fact that, in connecting rods A through D, the molten metal can be filled well into and integrated with the fiber shaped article F due to the two-stage application of pressure, so that there are neither portions of the fiber shaped article into which the molten metal has not been filled, nor mold cavities in the matrix itself. In the comparative connecting rods E through G, the occurrence of portions into which molten metal has not been filled and mold cavities was observed, so that the fatigue strength dropped.

The reason why the speed of the molten metal flowing through the gate $11_1$ is limited to the range of 0.09 to 0.17 m/sec is to make the molten metal flow under laminar conditions, and thus make the flow smoother. If the speed is above this range, an undesirable turbulent flow will occur, and if it is below this range, the temperature drop in the molten metal will become extreme.

The stroke of the second and third press punches $14_2$, $14_3$ into the small-end forming portion $6b$ and the runner box 15 is preferably from about 4 mm to about 12 mm if the thickness of the small-end hole 8 at the small-end portion 18 in the direction of the center line is about 30 mm. With this value, the presence of portions of the fiber shaped article F into which molten metal has not been filled, and the occurrence of, mold cavities in the matrix itself, can be effectively prevented.

Incidentally, only the molten metal in the proximity of one end of the fiber shaped article could be pressed, depending upon the shape of the composite material.

Although one embodiment of the invention has thus been described, it is obvious to those skilled in the art that various changes and modifications can be made thereto without departing from the spirit and scope of the invention.

What is claimed is:

1. A method of producing a fiber-reinforced composite body comprising the steps of:
   arranging a fiber shaped article in a cavity of a casting mold;
   filling a molten metal acting as a matrix into said cavity and subjecting it to primary pressure;

holding said molten metal under said primary pressure for a predetermined period of time to bring said molten metal into a semi-solidified state; and subjecting said molten metal now in said semi-solidified state, to a hydrostatic pressure of a magnitude greater than said primary pressure while a secondary pressure of higher magnitude than said primary pressure is additionally and simultaneously applied locally in proximity to at least one end of said fiber shaped article to completely fill said molten metal into said fiber shaped article to integrate said metal and said article.

2. The method of producing a fiber-reinforced composite body as defined in claim 1 wherein said fiber shaped article consists of metal fibers.

3. The method of producing a fiber-reinforced composite body as defined in claim 1 wherein said molten metal consists of an aluminum alloy.

4. The method of producing a fiber-reinforced composite body as defined in claim 1, wherein said primary pressure is between 360 to 600 kg/cm².

5. The method of producing a fiber-reinforced composite body as defined in claim 1, wherein said molten metal is held under said primary pressure for between 1 to 10 seconds.

6. The method of producing a fiber-reinforced composite body as defined in claim 1, wherein said secondary pressure is between 1,000 to 2,500 kg/cm².

7. The method of producing a fiber-reinforced composite body as defined in claim 1, wherein said casting mold is heated to between 250° to 350° C. before casting is effected.

8. The method of producing a fiber-reinforced composite body as defined in claim 1, wherein said fiber shaped article is heated to between 460° to 700° C. before casting is effected.

9. The method of producing a fiber-reinforced composite body as defined in claim 1, wherein said fiber-reinforced composite material is a connecting rod for an internal-combustion engine including a big-end portion, a small-end portion, and a fiber-reinforced rod portion connecting said big-end portion to said small-end portion; said cavity of said casting mold consists of a big-end forming portion, a small-end forming portion and a rod-forming portion positioned between said big-end and small-end forming portions; said fiber shaped article of a rod-like form is arranged at the center of said rod-forming portion; and after said molten metal is filled into said cavity and is held under said primary pressure for a predetermined period of time, said big-end and small-end forming portions are compressed with said secondary pressure.

10. The method of producing a fiber-reinforced composite body as defined in claim 9 wherein said casting mold has a runner box communicating with said small-end forming portion and becoming filled with molten metal.

11. The method of producing a fiber-reinforced composite body as defined in claim 10 wherein said molten metal filled into said runner box is subject to a high hydrostatic pressure simultaneously with the application of said secondary pressure.

12. The method of producing a fiber-reinforced composite body as defined in claim 1 wherein the secondary pressure is applied locally to the molten metal in semi-solidified state by displacing a press punch of relatively small diameter, under pressure, against said molten metal in semi-solidified state.

13. In a method of producing a fiber-reinforced composite member including the steps of arranging a fiber shaped article in a cavity of a casting mold, pouring a molten metal acting as a matrix into said cavity and applying a high hydrostatic pressure to the molten metal to cause the molten metal to be filled into and integrated with said fiber shaped article by high-pressure solidification casting, the improvement wherein said molten metal is held under primary pressure for a predetermined period of time so as to be brought into a semi-solidified state, and then the molten metal in said semi-solidified state is subjected to a hydrostatic pressure of a magnitude greater than said primary pressure while a secondary pressure of a magnitude greater than said primary pressure is additionally and simultaneously applied locally to said molten metal in semi-solidified state in proximity to at least one end of said fiber shaped article.

14. The method of producing a fiber-reinforced composite body as defined in claim 13, wherein said fiber shaped article consists of metal fibers.

15. The method of producing a fiber-reinforced composite body as defined in claim 13 wherein said molten metal consists of an aluminum alloy.

16. The method of producing a fiber-reinforced composite body as defined in claim 13, wherein said fiber-reinforced composite material is a connecting rod for an internal-combustion engine including a big-end portion, a small-end portion, and a fiber-reinforced rod portion connecting said big-end portion to said small-end portion; said cavity of said casting mold consists of a big-end forming portion, a small-end forming portion, and a rod-forming portion positioned between said big-end and small-end forming portions; said fiber shaped article is of rod-like form and arranged at the center of said rod-forming portion; and after said molten metal is filled into said cavity and is held under said primary pressure for a predetermined period of time, said big-end and small-end forming portions are subjected to hydrostatic pressure while being additionally pressurized locally.

17. The method as claimed in claim 13 wherein the primary pressure is between 360 to 600 Kg/cm² and the secondary pressure is between 1000 to 2500 Kg/cm².

18. The method as claimed in claim 13 wherein the application of said primary and local secondary pressures are carried out by separate means.

19. The method as claimed in claim 13 wherein the molten metal is compressed hydrostatically at a pressure of between 1,000 to 1,200 kg/cm² while said parts of the molten metal are subjected to said local secondary pressure of a magnitude between 1,000 and 2,500 kg/cm².

* * * * *